Feb. 15, 1938. T. E. M. WHEAT 2,108,279
MOTOR VEHICLE FRAME
Filed Feb. 21, 1934 2 Sheets-Sheet 1
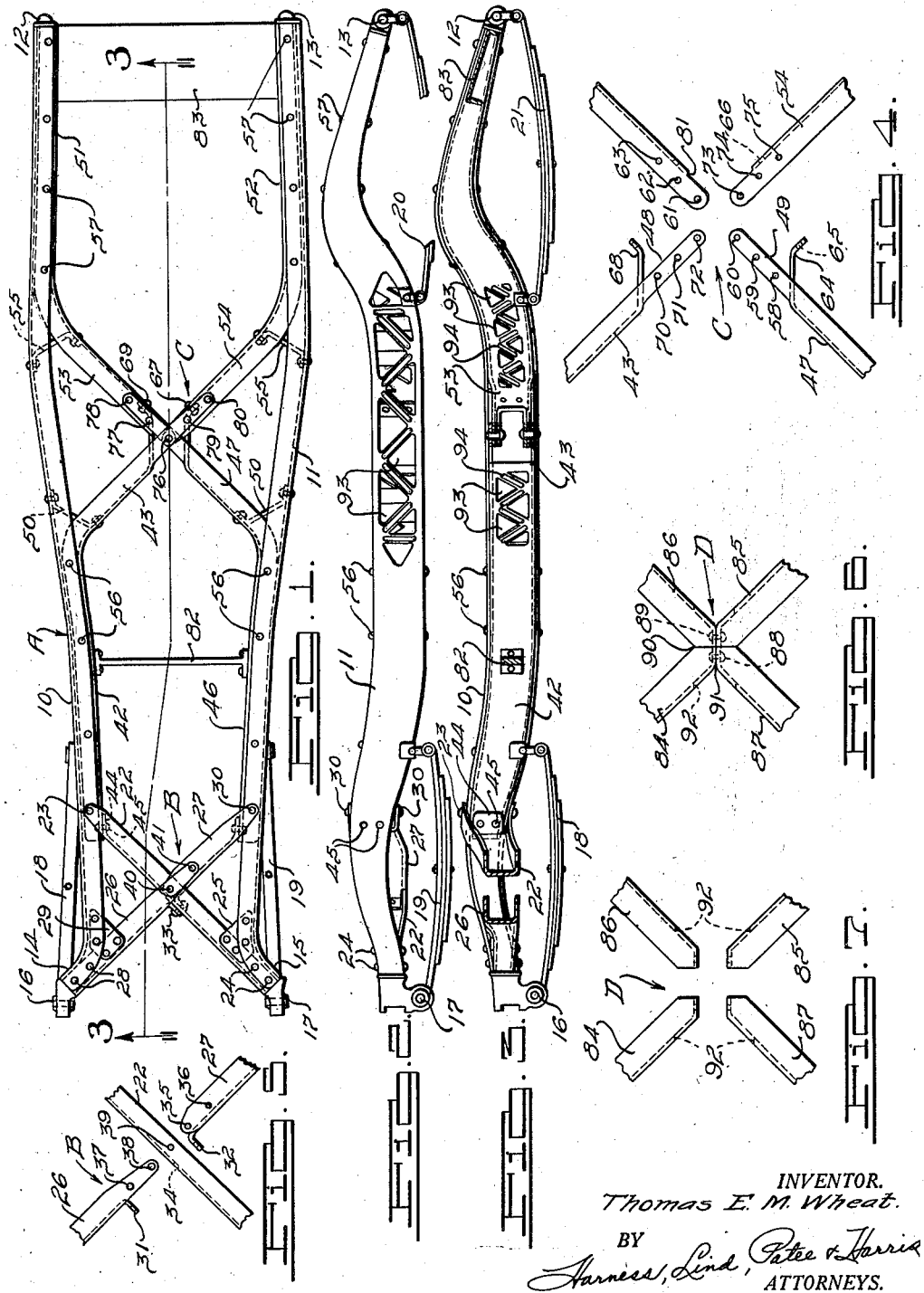
INVENTOR.
Thomas E. M. Wheat.
BY
Harness, Lind, Patee & Harris
ATTORNEYS.

Feb. 15, 1938.   T. E. M. WHEAT   2,108,279
MOTOR VEHICLE FRAME
Filed Feb. 21, 1934   2 Sheets-Sheet 2
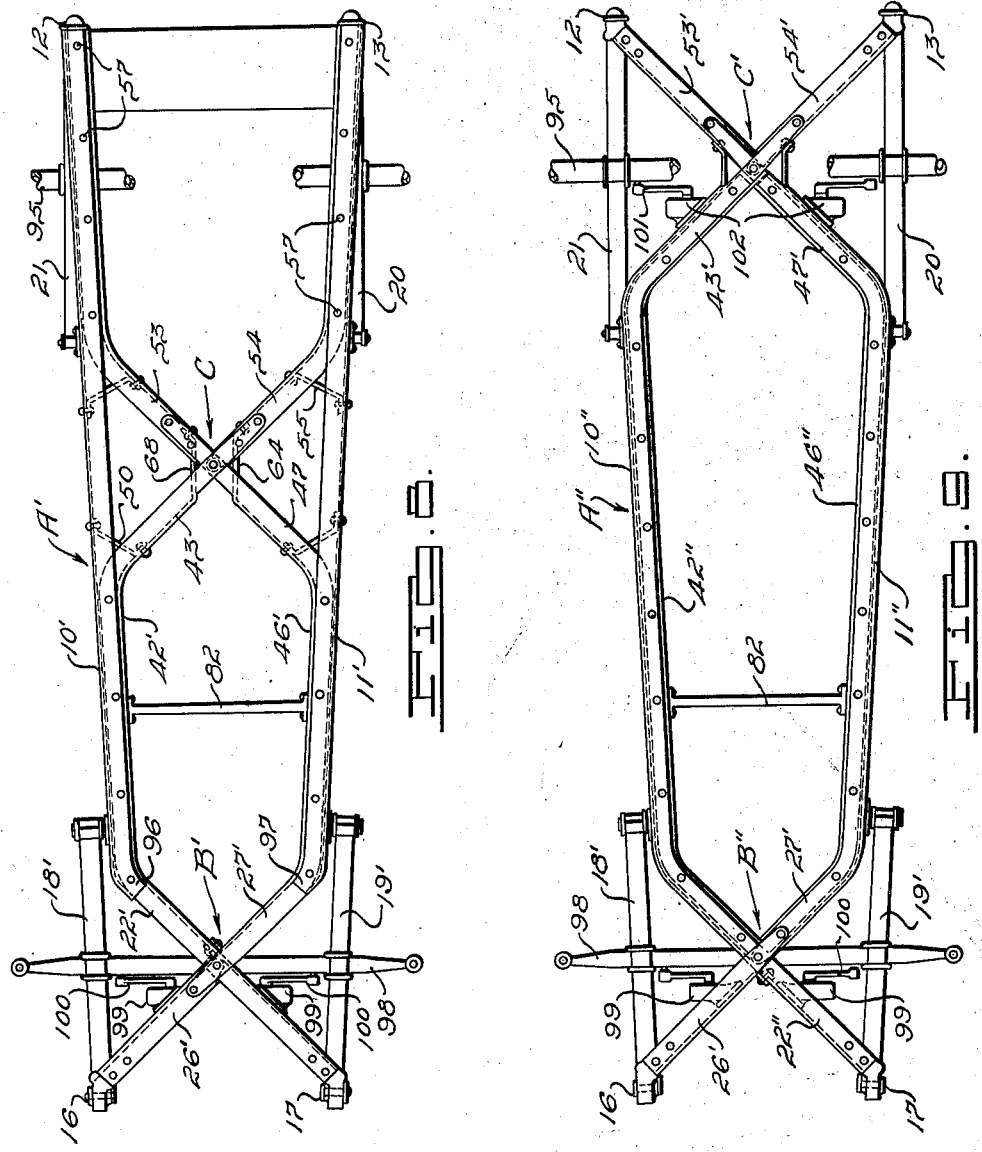
INVENTOR.
Thomas E. M. Wheat.
BY
Harness, Dind, Patee & Harris
ATTORNEYS.

Patented Feb. 15, 1938

2,108,279

UNITED STATES PATENT OFFICE 2,108,279

MOTOR VEHICLE FRAME

Thomas E. M. Wheat, Highland Park, Mich., assignor to Chrysler Corporation, Detroit, Mich., a corporation of Delaware Application February 21, 1934, Serial No. 712,276

26 Claims. (Cl. 280—106)

This invention relates to motor vehicles and refers more particularly to improvements in chassis frames therefor.

One of the objects of my invention is to provide a frame structure having improved rigidity and resistance to torsional deflection and at the same time reducing the weight of the frame in comparison with conventional types of frame structures.

A further object of my invention resides in the provision of an improved frame structure having one or more X-bracings connecting the transversely spaced, longitudinally extending main side members or sills. One of the X-braces is preferably located at or near the forward end of the frame structure and is preferably provided, according to one feature of my invention, with forwardly extending, diverging arm portions thereof adapted to receive the spring supporting load. In one embodiment of my invention the front end X-brace extends as a cantilever forwardly of the main side members so that, among other advantages, the load on the forwardly diverging arms of the X-brace is transmitted to the center of the frame structure and motor vehicle instead of along the side frames.

The aforesaid forwardly diverging arm portions of the main side frame members or arm portions of the X-brace may, according to one phase of my invention, serve to space the front load supporting springs from the side members so as to lighten and strengthen the frame structure and, in the case of the cantilever type of front X-brace, the front springs lie along the spaces longitudinally of the frame structure between the side members and the load receiving end portions of the forwardly diverging arms of the cantilever X-brace.

A further feature of my invention resides in the provision of an X-brace providing substantially a single point of intersection for the component arm portions of the X-brace so as to avoid eccentricity of loading and to provide increased stiffness and rigidity in the frame structure.

A still further feature of my invention resides in the provision of an X-brace fabricated as a part of a frame structure wherein the component arms of the X-brace are provided with a novel construction and arrangement of weight reducing holes or openings and these openings may, if desired, be employed at other portions of the frame structure such as along the side members or at other places if desired. These openings are preferably noncircular and they are arranged so that adjacent openings vertically overlap each other longitudinally of the frame member in which they are formed so as to maintain a substantially constant cross sectional area and to thereby provide uniform strength and minimum weight of such member. I preferably provide ribs separating these openings, the ribs being embossed to thereby increase their resistance to compressive forces.

My invention, according to one embodiment thereof, provides a pair of main side members which are crossed at one or both ends of the frame structure so as to provide the aforesaid cantilever-like X-bracings. The wheel carrying axles preferably extend transversely of the frame structure and are preferably, although not necessarily, arranged to extend approximately beneath the point of intersection of the component arm portions of the X-bracings, shock absorbers actuated by the respective wheel carrying axles being preferably mounted on the X-bracings near the centers thereof so as to eliminate disturbing forces usually encountered at the side rails which are ordinarily utilized to mount the shock absorbers. By reason of my novel frame structure, I have provided a spring suspension which gives approximately the effect of independent wheel springing for each of the vehicle wheels associated with the aforesaid cantilever-like X-brace, although I attain this effect through the use of a spring suspension which may generally conform with conventional arrangements generally used heretofore. By reason of my invention, twisting of the motor vehicle under torsion producing stresses is virtually eliminated, the motor vehicle being raised or lowered vertically substantially at the center points of the X-braces aforesaid.

As a still further feature of my invention I have provided main side members or rails which are reinforced by a box-like fabrication of welded or riveted component members, the box-like construction preferably extending substantially from the center of the forward X-brace and rearwardly thereof so as to render the frame structure stable against torsional forces incident to bending of the side members. Where the X-braces are employed both forwardly and rearwardly of the frame structure, I prefer to employ the aforesaid box-like reinforcing continuously from substantially the centers of the X-bracings toward each other along the main side members.

A still further feature of my invention resides in the provision of improved means for fabricating or forming the component arm portions of one or more X-bracings, the resulting joints having improved strength, resistance to torsion, reduction in weight and cost, and generally providing improved efficiency.

Further objects and advantages of my invention reside in the novel combination and arrangement of parts as will be more particularly apparent from the following detailed description of several embodiments of my invention, reference being had to the accompanying drawings in which:

Fig. 1 is a top plan view of my frame structure.

Fig. 2 is a side elevational view thereof.

Fig. 3 is a longitudinal sectional elevational view, the section being taken along the line 3—3 of Fig. 1.

Fig. 4 is a plan view of the rear X-brace, the parts thereof being shown in their positions prior to assembly.

Fig. 5 is a plan view of the front X-brace, the parts thereof being illustrated in their positions prior to assembly.

Fig. 6 is a detail plan view illustrating a modified form of X-brace.

Fig. 7 is a plan view of the X-brace illustrated in Fig. 6 but showing the parts thereof prior to assembly.

Fig. 8 is a plan view of a modified form of my frame structure.

Fig. 9 is a plan view of a still further modified form of my frame structure.

In the drawings and referring particularly to Figs. 1 to 5 inclusive, the frame structure A is illustrated as comprising a pair of transversely spaced, longitudinally extending main side members, sills, or rails 10 and 11, these side members being illustrated as extending from the rear spring shackle bearing supports 12 and 13 respectively forwardly. The side members preferably converge toward each other as they extend forwardly and they preferably terminate in forwardly diverging load receiving arm portions 14 and 15, these arm portions carrying the front spring shackle bearing supports 16 and 17. The converging forward portions of the side members 10 and 11 terminating in the diverging arm portions 14 and 15 respectively provide for supporting the front springs as generally indicated by the construction lines 18 and 19, these springs being thereby spaced laterally from the respective main side members as will be apparent from Fig. 1. The rear springs may be suitably mounted as generally indicated by the construction lines 20 and 21 appearing in Figs. 2 and 3 respectively, the construction of the springs themselves and the shackle mountings therefor not being illustrated in detail as such constructions may conform with general well-known practice.

Near the front end of the frame structure A I have provided an X-brace B and spaced rearwardly therefrom I preferably provide a second X-brace structure indicated at C. The X-brace B is constructed to provide connecting means for the side members 10 and 11, this connecting means comprising a relatively long arm portion or member 22, this member at one end thereof having its upper and lower flanges in contact with the flanges of the side member 10 and being secured thereto by suitable means such as welding or by the rivets 23, the other end of said member being connected to the diverging terminal arm portion 15 of the side member 11 by suitable rivets 24. A plate 25 may be provided to additionally strengthen the connection between the arm member 22 and the side member 11 as illustrated in Fig. 1.

The X-brace B is further provided with the relatively short diagonally aligned arm portions 26 and 27 intersecting the relatively long arm portion 22 at substantially the midpoint thereof, the arm portion 26 being secured at its outer end to the diverging arm portion 14 of the side member 10 by reason of rivets 28 and a plate 29, the arm portion 27 having its upper and lower flanges overlying the flanges of the side member 11 and being secured thereto by rivets 30. As will be best noted in Fig. 5 the arm portion 26 has its web cut back from the inner end of the arm portion and bent outwardly to provide a flange 31, the arm portion 27 having its web terminating in a flange extension 32. The flanges 31 and 32 extend in the general direction of the web of the relatively long arm portion 22 and these flanges are adapted to be riveted together at 33, the rivet passing through the rivet hole 34 provided in the web of the arm portion 22. The upper and lower flanges of the arm portion 27 are adapted to receive therewithin the corresponding flanges of the arm portion 22 and the inwardly projecting flanges of the arm portion 26 are adapted to receive therewithin the flanges of the arm portion 27 as best seen in Fig. 1. The arm portion 27 has rivet holes 35 and 36 and the arm portion 26 has rivet holes 37 and 38, the flanges of the arm portion 22 being provided with a rivet hole 39 illustrated in Fig. 5. On assembly of the arm portions a rivet 40 extends through the aligned holes 37, 35 and 39 and a further rivet 41 extends through the holes 38 and 36.

It will be noted that the X-brace B is adapted to torsionally strengthen the forward end of the frame structure A by preventing differential movements between side rails 10 and 11, the load transmitted to the forward ends of the frame structure by reason of the spring supports 16 and 17 being largely transmitted through the diagonally extending arm portions of the X-brace B.

In Fig. 1 the X-brace C is illustrated as lying intermediate the ends of the frame structure. This X-brace, according to this embodiment of my invention, comprises a supplemental side member 42 having its web laterally spaced opposite the web of the side member 10 and also having its vertically spaced flanges contacting within the respective flanges of the side member 10 thereby providing a box-like structure extending preferably from a point just forwardly of the rivet 23 and rearwardly therefrom to provide the diagonally extending arm portion 43 of the X-brace C. As will be noted in Fig. 1 the web of the arm portion 22 in X-brace B is deflected at 44 to lie along the web of the supplemental side member 42 and is connected thereto by a rivet 45. In similar manner a supplemental side member 46 is provided in association with the main side member 11, the side member 46 likewise providing the diagonally extending arm portion 27, the arm portions 43 and 47 converging toward each other and respectively terminating in flanges 48 and 49. The arm portions 43 and 47 may be further connected to the respective main side members 10 and 11 at the points where they diverge inwardly from these side members, by the plates 50 suitably riveted to the webs of the channeled members associated therewith.

The rear portions of the main side members 10 and 11 respectively are provided with rear supplemental side members 51 and 52 extending forwardly and converging toward the center of the X-brace C by reason of the respective diagonally extending arm portions 53 and 54 which are respectively diagonally aligned with the aforesaid arm portions 47 and 43. The rear supplemental side members 51 and 52 are generally similar to the forward supplemental side members 42 and 46 in that they also provide a box-like construction for the rear portions of the main side members of the frame structure and similar reinforcing plates 55 are likewise riveted between the webs of the respective side members and diagonally extending arm portions which are associated therewith and which will be apparent from Fig. 1.

The vertical plates 50 and 55 lie across the line of shear forces tending to distort the frame members to which they are respectively connected. Thus these plates 50 and 55 are vastly more rigid in shear than more conventional horizontal plates at such joints as will be noted by comparing these plates with the upper and lower horizontal plates 25 and 29 for example. Also, the plates 50 and 55 provide improvements in that a single plate takes the place of a pair of horizontal plates such as are used at 25 and 29 for example. If desired the vertical plates, or other parts of the frame fabrication, may be welded instead of riveted in place.

The location of the plates 50 and 55 with respect to the juncture of the X-brace arm portions and the side rails and with respect to the central region of the X-brace structure is of importance in realizing the greatest benefits from these plates. As typical of the preferred arrangement of these plates, the plate 50 at side rail or member 10 is disposed vertically in the acute angle formed between side member 10 and the obliquely extending arm portion 43. The upper and lower flanges of arm portion 43 face toward the respective upper and lower flanges of side member 10 and overlap the latter flanges at the juncture with the side member 10 to obtain maximum rigidity forwardly of the plate and especially at the juncture of the side member 10 and arm portion 43.

This plate 50 has its point of attachment with side member 10 spaced longitudinally of the frame from said juncture and well beyond the overlapping flanges while the point of attachment of the plate with arm portion 43 is disposed along the oblique length of the arm portion relatively remotely from the arm-connecting means (including webs 64 and 68 hereinafter more particularly described) at the central region of the X-brace structure. The shear plate 50 thus effectively resists distortion of the frame members, to which it is connected, at the juncture of these frame members. While said plate 50 is thus disposed adjacent the juncture of the frame parts 10 and 43, and is therefore of relatively short length, the point of its attachment with side member 10 should be disposed well beyond the projection of arm portion 43 on side member 10 in the oblique direction of this arm portion in order that it may effectively lie across the line of shear forces tending to distort side member 10 and arm portion 43. The other plate 50 at side member 11 and the plates 55 are preferably likewise disposed in their respective acute angles.

The associated flanges of the supplemental side members 42 and 46 and the main side members 10 and 11 are riveted together as indicated at 56 and in a similar manner rivets 57 serve to secure the rear supplemental side members 51 and 52 to the respective main side members 10 and 11.

Referring particularly to Figs. 1 and 4 it will be noted that the arm portions 47 and 53 together form a pair of diagonally aligned arm portions having overlapping ends at substantially the center of the X-brace C. Thus, the projecting flanges 49 of the arm portion 47 are adapted to overlie the flanges of the arm portion 53, the flanges 49 having rivet holes 58, 59, and 60 respectively aligning with rivet holes 61, 62 and 63 of the arm portion 53. The web of the arm portion 47 is cut back from the terminal flanges 49 and bent at 64 so as to lie in the direction of the web of arm portion 54, the bent web 64 having a rivet hole 65 adapted for alignment with a rivet hole 66 in the web of arm portion 54, a rivet 67 shown in Fig. 1 passing through these aligned holes.

In similar manner the arm portion 43 is provided with a bent web portion 68 connected by a rivet 69 to the web of the arm portion 53. Likewise the projecting flanges 48 of arm portion 43 are formed with a series of rivet holes 70, 71, and 72 respectively adapted for alignment with holes 73, 74, and 75 formed in the terminal flanges of the arm portion 54. It will thus be noted that the portions 43 and 54 provide a second pair of diagonally aligned arm portions having overlapping ends, these ends also overlapping the ends of the aforesaid pair of diagonally aligned arm portions 47 and 53. Thus, after the flanges 49 have been placed in overlapping relationship with the flanges of the arm portion 53, the terminal flanges of the arm portion 54 are assembled in overlapping relationship with the flanges 49 and then the terminal flanges 48 of the arm portion 43 are placed in overlapping relationship with the flanges of the arm portion 54.

A rivet 76 is thus adapted to pass through aligned holes 70, 73, 58, and 61, rivet 77 passing through holes 59 and 62. The rivet 78 also passes through holes 60 and 63, rivet 79 through holes 71 and 74 and the rivet 80 passing through aligned holes 72 and 75.

It will be noted that the webs of the arm portions 53 and 54 are cut back to a suitable point as indicated at 81 in Fig. 4 so as to cooperate with the bent webs 64 and 68 to form an opening through the center of the X-brace C to receive the usual driving propeller shaft which may extend through the opening thus formed, the X-brace B providing a convenient and rigid support for the usual engine of the motor vehicle, the engine and propeller shaft not being illustrated in my drawings. If desired one or more cross braces may be provided between the side members 10 and 11 and one of such cross braces is indicated at 82 in Fig. 1 and another at the rear at 83.

Referring particularly to Figs 2 and 3, I have illustrated the feature of my invention which relates to the provision of one or more portions of the frame structure being provided with non-circular weight reducing openings so as to maintain substantially constant sectional area along the length thereof and to thereby provide uniform strength with a minimum of weight. Thus, the webs of the main side members 10 and 11 in the region of the X-brace C and also the arm portions forming the X-brace are illustrated as having a series of openings or holes 93. These openings are preferably triangular in shape and are separated by ribs 94 which are a part of the web in which such holes are formed, the apices of the triangular openings 93 being alternately oppositely directed whereby the openings will vertically overlap each other and will thereby provide a substantially constant cross sectional area at various points along the webs which are formed with the openings 93. The ribs 94 are preferably embossed for strengthening purposes, preferably by deforming the central zone of the ribs inwardly of the frame as shown in Figs. 2 and 3.

If desired, the use of rivets at one or more points in the frame structure may be dispensed with or supplemented by welding or other means of joining the various component portions of the frame structure. Referring to Figs. 6 and 7 I have illustrated a modified form of X-bracing which employs a welded connection of the component parts supplemented by the use of rivets. This X-bracing indicated at D may, if desired, be substituted for the X-braces B or C or both or such X-brace D may be placed at other desirable locations longitudinally of the frame structure A. The X-brace D comprises diagonally aligned arm portions 84, 85 and a second pair of cooperating diagonally aligned arm portions 86, 87, the inner terminal ends of these arm portions having their flanges bent inwardly to the point of intersection of the X-brace and being suitably perforated to receive rivets 88 and 89 illustrated in Fig. 6. The terminal flanges of the arm portions are also beveled so as to present closely nested face contacts which may be welded as indicated at 90 and 91. A portion of the webs of the several arm portions may be cut away as indicated at 92 to provide a suitable opening through the center of the brace to receive the aforesaid propeller shaft especially where the X-brace D is employed at a point along the frame structure rearwardly of the engine. When the X-brace D is used at the front of the frame the opening provided at 92 will accommodate the starter crank (not shown) for turning over the crankshaft of the engine which may be supported at its front end by the X-brace. If desired, a similar opening may be provided in the X-brace B.

Referring now to Fig. 8 I have illustrated a somewhat modified form of my invention, the frame structure A' illustrated therein being substantially similar to the aforesaid frame structure A of Fig. 1 at least rearwardly thereof from the vicinity of the cross member 82. I have therefore applied to Fig. 8 similar reference characters as have been noted on Fig. 1, Fig. 8 further illustrating the rear axle 95 which supports the rear end of frame structure A' through the intermediary of the aforesaid rear springs 20 and 21.

In Fig. 8 the front X-brace B' extends cantilever-like from the main side members 10' and 11' which in this instance may terminate in the forwardly converging terminal portions 96, 97 respectively aligned with the relatively long and short arm portions 22' and 27' which form the X-brace B'. The arm portions 22' and 27' are respectively continuations of the arm portions 43 and 47 of the X-brace C and the supplemental side members 42' and 46' which provide the box-like construction for the side members intermediate the X-braces B' and C. The X-brace B' is also formed with the component arm portion 26' which terminates outwardly thereof in the spring shackle bearing support 16, the arm 22' terminating at the other bearing support 17. The manner of forming the center joint of the X-brace B' is identical with that illustrated and described in connection with the X-brace B of Fig. 1 with the exception that in Fig. 8 the arm portion 27' is adapted to overlap the arm portion 26' instead of arranging the arm portion 26 so as to overlap the arm portion 27 as shown in connection with Fig. 1.

In Fig. 8 it will be noted that the front springs 18' and 19' are arranged along the spaces provided at the sides of the X-brace B', the load transmitted by the bearing supports 16 and 17 being transmitted by the arm portions 26' and 27' respectively directly to the central part of the X-brace B' instead of along the main side members 10' and 11' of the frame structure A'. The front axle 98 is preferably arranged to extend beneath substantially the center of the X-brace B', suitable shock absorbers 99 being supported by the arm portions such as arm portions 26' and 27'. The shock absorbers 99 are preferably mounted relatively close to the center of the X-brace B', it being noted that the shock absorbers have arms 100 actuated by axle 98, the arrangement being such that disturbing forces set up by the action of the shock absorbers will not be transmitted along the main side members of the frame structure in a manner generally experienced in present day practice.

Referring now to Fig. 9, I have illustrated a still further modified embodiment of my invention in which the frame structure A" is formed with an X-brace structure extending cantilever-like not only from the front end of the frame structure but also from the rear end thereof. In Fig. 9 the main side member 10" is illustrated as extending integrally from the center of the rear X-brace C' to provide the diagonally extending arm portion 22" and terminating at the spring shackle bearing support 17, the supplemental side member 42" cooperating with the main side member 10" to provide a box-like construction extending from substantially the centers of the X-braces C' and B". The main side member 11" extends from the center of the rear X-brace C' integrally to the center of the front X-brace B", the supplemental side member 46" extending throughout the length of the main side member 11". The main side member 11" thus in itself provides the arm portion 27', as in the case of Fig. 8, this arm portion being diagonally aligned with the arm portion 26' which, as in the case of Fig. 8, terminates in the front shackle bearing support 16. The manner of joining the component arm portions of the X-brace B" is similar to that illustrated in Fig. 1 and will therefore not be further described in detail. In Fig. 9 it will also be noted that the front axle 98 and shock absorbers 99 are illustrated in a manner similar to that shown in Fig. 8, these parts together with the springs 18', 19' cooperating with the front X-brace in a manner similar to that described in connection with Fig. 8.

Referring further to Fig. 9, it will be noted that the main side member 10" forms the arm portion 43' of the X-brace C', this arm portion 43' corresponding to the arm portion 43 of Fig. 1, and being diagonally aligned with the arm portion 54' which terminates outwardly thereof at the spring shackle bearing support 13. Likewise, the main side member 11" forms the arm portion 47', the latter being diagonally aligned with the arm portion 53' which terminates in the rear spring bearing support 12.

The joint at the center of the X-brace C' is formed in a manner substantially similar to that illustrated and described in connection with Fig. 1 and will therefore not further be described in detail. In Fig. 9 the rear axle 95 is shown as actuating the arms 101 connected to the shock absorbers 102 which, like the aforesaid shock absorbers 99 at the front springs, are preferably associated relatively closely with the center of the X-brace associated with and supporting these shock absorbers 102. It will be noted that the rear springs 20, 21 are associated with the spaces provided by the open sides of the X-brace C', these rear springs being thus somewhat similarly arranged in association with the cantilever-like X-brace C' as the front springs 18', 19' are associated with the side openings provided by the X-brace B'' at the front of the frame structure A''.

By reference herein to a one point intersection of the X-braces for avoiding eccentricity, I mean that the vertical planes along the center of gravity lines of the diagonal members of the X-braces intersect each other at a common vertical line for the Fig. 5 type of joint or substantially so for the Fig. 4 or Fig. 6 types of joints for example.

It will be noted that in each of the embodiments of my invention shown in Figs. 1, 8, and 9 the frame structures A, A' and A'' respectively terminate at one end (both ends in the case of Fig. 9) in outwardly diverging arms presenting an open space transversely of the frame structure at said end thereof and inwardly of the longitudinal mid-section of the frame structure. This end open space is provided between the outer load carrying end portions of the diverging arms and extends inwardly longitudinally of the frame structure, the diverging arms bounding this open space.

In the case of Figs. 8 and 9 the diverging arms are cantilevers supported at the central regions of the respective X-braces B' and B''. Thus these open-ended X-braces project cantilever-like from the side rails 10', 11' and 10'', 11'', the arms of each brace crossing one another beyond the longitudinally extending ends of the side rails to define side open spaces extending laterally inwardly of the frame structure between the side rails and the free ends 16, 17 of the X-brace arm ends. These side spaces are bounded laterally inwardly by the respective arms of the X-braces as shown in Figs. 8 and 9.

While it is believed that from the foregoing description of the several illustrated embodiments of my invention, the nature and advantages of my invention will be readily understood, I desire to point out that I do not limit myself to what is herein shown and described in detail and that such changes may be resorted to when desired as fall within the scope of the appended claims.

What I claim is:

1. A motor vehicle frame structure including spaced side members extending longitudinally of the frame structure, means connecting said side members near one end of said frame structure, said frame structure having arms at said end thereof, said arms diverging longitudinally of the frame structure from said connecting means to provide load receiving end portions respectively spaced longitudinally beyond the ends of said side members, said connecting means for said side members being disposed between said diverging arms and said side members whereby said connecting means structurally connects said diverging arms with said side members.

2. A motor vehicle frame structure including spaced side members extending longitudinally of the frame structure, said structure terminating at one end thereof in a substantially X-shaped brace, said X-shaped brace having a pair of its arms extended from said side rails respectively, the other pair of arms thereof being extended cantilever-like from the first said pair of arms.

3. A motor vehicle frame structure including spaced side members extending longitudinally of the frame structure, a substantially X-shaped brace at the front end of said frame structure, said X-shaped brace including a relatively long arm portion extending diagonally across the front of the frame structure and further including a pair of relatively short diagonally aligned arm portions intersecting the relatively long arm portion at substantially the mid-point thereof, said relatively short arm portions having overlapping ends at said intersection, means connecting said overlapping ends to each other and to said relatively long arm portion, each of said relatively short arm portions having a flange projecting therefrom and lying in the direction of said relatively long arm portion, and means connecting said flanges to each other and to said relatively long arm portion.

4. A motor vehicle frame structure including spaced side members extending longitudinally of the frame structure, a substantially X-shaped brace at the front end of said frame structure, said X-shaped brace including a relatively long arm portion extending diagonally across the front of the frame structure and further including a pair of relatively short diagonally aligned arm portions intersecting the relatively long arm portion at substantially the mid-point thereof, said relatively short arm portions having overlapping ends at said intersection, means connecting said overlapping ends to each other and to said relatively long arm portion, each of said relatively short arm portions having a flange projecting therefrom and lying in the direction of said relatively long arm portion, and means connecting said flanges to each other and to said relatively long arm portion, a second substantially X-shaped brace spaced rearwardly of the first said X-shaped brace, said second brace including a pair of diagonally aligned arm portions having overlapping ends at substantially the center of the second said X-shaped brace, said second brace further including a second pair of diagonally aligned arm portions having ends overlapping each other and also overlapping the said ends of the first said pair of arm portions of said second brace, and means connecting the overlapping ends of the said pairs of arm portions of the second said X-shaped brace.

5. In a motor vehicle, a frame structure including spaced longitudinally extending side members, said structure terminating at one end thereof in an open-sided substantially X-shaped brace, an axle extending transversely of the frame structure beneath said X-shaped brace, and a shock absorber carried by said X-shaped brace and adapted for actuation by said axle.

6. In a motor vehicle frame structure, a pair of transversely spaced longitudinally extending side members, said side members converging forwardly thereof toward each other and terminating in relatively short diverging portions, and an X-brace between said side members at one end of said frame structure, said X-brace having a pair of diverged arms connected at their outer ends to the diverged ends of said side member portions respectively.

7. In a motor vehicle frame, a pair of transversely spaced longitudinally extending side members, and a pair of substantially X-shaped structures spaced longitudinally of said frame and connecting said side members, one of said structures projecting cantilever-like at one end of said frame.

8. In a motor vehicle frame structure, a pair of transversely spaced longitudinally extending side members, a member extending diagonally between said side members and adapted to torsionally strengthen said side members, one of said members having a series of non-circular openings extending therethrough and providing substantially uniform cross-sectional area of the last said member substantially along the region thereof having said openings.

9. In a motor vehicle frame structure, a pair of transversely spaced longitudinally extending side members, a substantially X-shaped brace connecting said side members, said side members having portions thereof extending between said X-shaped brace, the component members of said X-shaped brace and said portions of the side members being provided with a series of overlapping spaced openings, one of said members having embossed ribbed portions between its said series of openings.

10. A motor vehicle frame structure including transversely spaced longitudinally extending side members, said frame structure terminating at one end thereof in outwardly diverging arms presenting an open space transversely of said frame structure at said end thereof and inwardly toward the longitudinal mid-section of said frame structure at said end thereof, said arms intersecting substantially along said longitudinal mid-section and defining the boundary of said open space longitudinally inwardly of said frame structure from said end thereof.

11. A motor vehicle frame having a transversely extending bracing structure at one end thereof, and a pair of rigid arms diverging cantilever-like longitudinally outwardly of the frame from said bracing structure, said arms diverging from substantially the longitudinal mid-portion of the frame.

12. A motor vehicle frame including transversely spaced longitudinally extending side members terminating at one end of said frame in a substantially X-shaped structure projecting cantilever-like from said side members.

13. A motor vehicle frame including transversely spaced longitudinally extending side members terminating at one end of said frame in a substantially X-shaped and open-ended structure projecting cantilever-like from said side members.

14. A motor vehicle frame structure including longitudinally extending side rails terminating at one end of said structure in oblique arms crossed beyond the extremities of said side rails at said frame structure end, portions of said crossed arms presenting spaces which are open laterally outwardly of said frame structure from the intersection of said arms.

15. A motor vehicle frame structure including longitudinally extending side rails terminating at one end of said structure in oblique arms crossed beyond the extremities of said side rails at said frame structure end, to provide diverging terminal arm portions free from direct interconnection with each other and with said side rails.

16. In a motor vehicle frame structure, a pair of longitudinally extending side rails, a substantially X-shaped brace connecting said rails, said brace including an arm portion defining an acute angle at the connection thereof with one of said rails, and a relatively short length reinforcing plate lying vertically in said angle between and secured to the last said rail and said arm portion, said plate being disposed relatively remotely from the center of said X-brace and closely adjacent said connection of said arm portion with said rail.

17. In a motor vehicle frame structure, spaced side members extending longitudinally of said structure, a substantially X-shaped brace connecting said side members, said brace including a unitary obliquely extending relatively long arm and further including a pair of relatively short arms obliquely aligned transversely of said long arm, means for connecting adjacent ends of said short arms to said long arm, and means for connecting the ends of said long arm to said side members respectively.

18. In a motor vehicle frame structure, spaced side members extending longitudinally of said structure, a substantially X-shaped brace connecting said side members, said brace including a pair of arms obliquely aligned and further including a second pair of arms separate from said first pair, said second pair of arms being obliquely aligned transversely of said first pair of arms, and means for uniting the adjacent ends of all of said arms at substantially the central zone of said X-shaped brace with at least one of said pairs of aligned arms relatively overlapping each other.

19. In an automobile frame having side sills, an X-cross bar comprising four channel-shaped legs disposed diagonally to form an X and having their outer ends attached to the respective side sills, the inner ends of the legs meeting at a central point and having their upper and lower lateral flanges disposed one above another and secured together at the center.

20. In an automobile frame having side sills, an X-cross bar comprising four channel-shaped legs disposed diagonally to form an X and having their outer ends attached to the respective side sills, the inner ends of the legs meeting at a central point and having their upper and lower lateral flanges disposed one above another and riveted together at the center, and the vertical webs of the legs at the inner ends being cut away to provide a longitudinal opening for receiving the drive shaft.

21. In a motor vehicle frame structure, a pair of longitudinally extending side rails, an obliquely extending reinforcing member branched from one of said side rails, and a vertically extending relatively short length reinforcing plate disposed in the corner formed by said branching of said reinforcing member from said side rail, said reinforcing plate being rigidly secured to said reinforcing member and to said side rail.

22. In an automobile frame having side sills, an X-cross bar comprising four channel shaped legs disposed diagonally to form an X and having their outer ends attached to the respective side sills, the inner ends of the legs being relatively offset vertically and meeting at a central point with their upper and lower lateral flanges disposed one above another and riveted together at the center.

23. In an automobile frame having side sills, an X-cross bar comprising four channel-shaped legs disposed diagonally to form an X and having their outer ends attached to the respective side sills, the inner ends of the legs being relatively offset vertically and meeting at a central point with their upper and lower lateral flanges disposed one above another and secured together at the center, and the vertical webs of the legs at the inner ends being cut away to provide a longitudinal opening for receiving the drive shaft and having its edges flanged at the opening to strengthen the webs.

24. In an automobile frame, two opposed sheet metal channel-shaped side rails extending longitudinally of the frame and having their upper and lower flanges facing inwardly, an X-member connecting said side rails and having legs of channel section, the forward legs having their upper and lower flanges facing outwardly, the ends of said forward legs extending along the side rails to provide sub-rails having their respective upper and lower flanges secured to the corresponding flanges of the side rails and forming a box-like section for the side rails for a predetermined length, and a tie-brace at the rear end of each box-like section joining the vertical webs of the legs of the X-member with the corresponding vertical webs of the side rails to prevent flexing of the frame.

25. In a motor vehicle frame, two opposed sheet metal channel-shaped side rails extending longitudinally of the frame and having their upper and lower flanges extending inwardly, an X-shaped brace structure comprising a pair of forwardly diverging channel-shaped component arms thereof and a pair of rearwardly diverging channel-shaped component arms thereof, each of said arms being connected with one of said side rails and defining an acute angle therewith, said X-shaped brace structure comprising arm-connecting means at the central region of the X-shaped brace structure to which said arms extended obliquely from the respective side rails, and a reinforcing shear plate lying vertically in one of said acute angles and attached to the webs of an arm and side rail which define said angle, said plate being disposed adjacent the connection of the last said arm and side rail for stiffening said connection, the point of said attachment of said reinforcing plate with the side rail being spaced longitudinally of the frame from the connection of this side rail and said plate-attached arm, said point of attachment being disposed well beyond the projection of said plate-attached arm on its connected side rail in its said oblique direction, the point of attachment of said reinforcing plate with said plate-attached arm being disposed along the oblique length of this arm relatively remotely from said arm-connecting means and from the central region of the X-shaped brace structure.

26. In a motor vehicle frame, two opposed sheet metal channel-shaped side rails extending longitudinally of the frame and having their upper and lower flanges extending inwardly, an X-shaped brace structure comprising a pair of forwardly diverging channel-shaped component arms thereof and a pair of rearwardly diverging channel-shaped component arms thereof, each of said arms being connected with one of said side rails and defining an acute angle therewith, said X-shaped brace structure comprising arm-connecting means at the central region of the X-shaped brace structure to which said arms extend obliquely from the respective side rails, and a reinforcing shear plate lying vertically in one of said acute angles and attached to the webs of an arm and side rail which define said angle, said plate being disposed adjacent the connection of the last said arm and side rail for stiffening said connection, the upper and lower flanges of said plate-attached arm facing toward the respective upper and lower flanges of the rail which is connected therewith and respectively overlapping the rail flanges at the juncture of this arm and rail, the point of said attachment of said reinforcing plate with the side rail being spaced longitudinally of the frame from said juncture, said point of attachment being disposed well beyond said overlapping flanges at said juncture, the point of attachment of said reinforcing plate with said plate-attached arm being disposed along the oblique length of this arm relatively remotely from said arm-connecting means and from the central region of the X-shaped brace structure.

THOMAS E. M. WHEAT.